July 28, 1936.  H. IMHOF  2,049,120
INTEGRATING INDICATING INSTRUMENT
Filed Feb. 14, 1934  2 Sheets-Sheet 1
Fig. 1
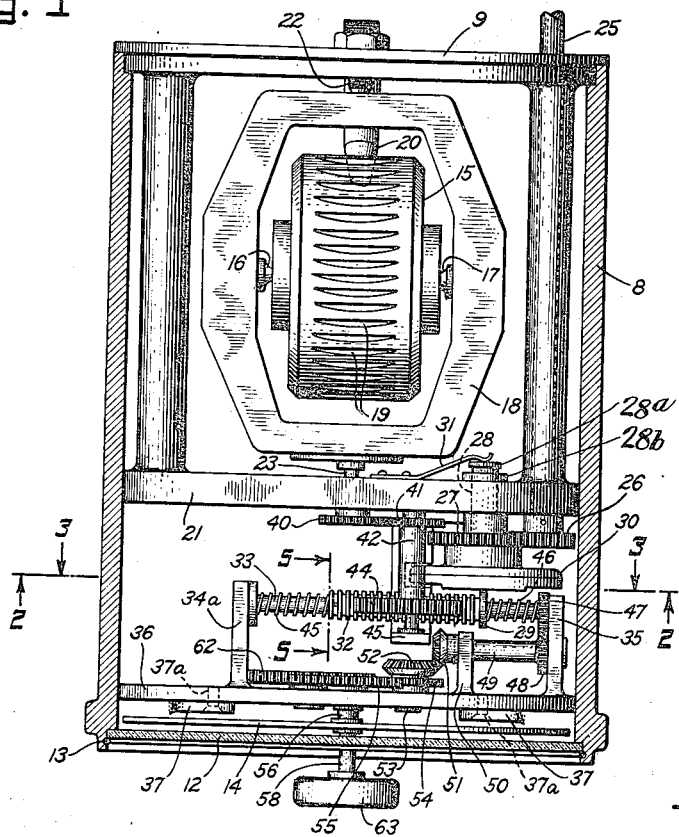
Fig. 2
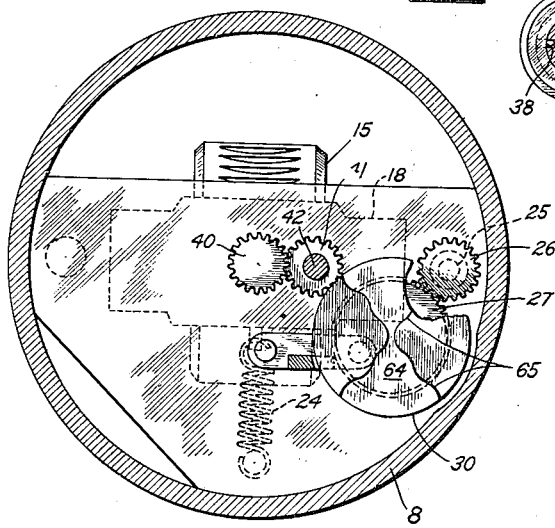
Fig. 5
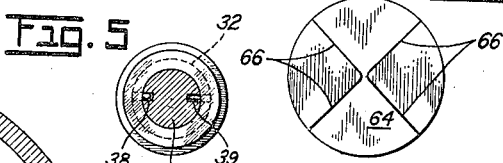
Fig. 6
Fig. 7
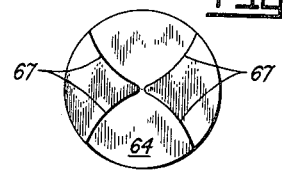
INVENTOR.
*HERMAN IMHOF*
BY *Stephen Cerstvik*
ATTORNEY.

Patented July 28, 1936

2,049,120

UNITED STATES PATENT OFFICE 2,049,120

INTEGRATING INDICATING INSTRUMENT

Herman Imhof, Jersey City, N. J., assignor to Eclipse Aviation Corporation, East Orange, N. J., a corporation of New Jersey Application February 14, 1934, Serial No. 711,240

4 Claims. (Cl. 33—204)

The present invention relates to integrating indicating instruments and, more particularly, to integrating mechanisms for such instruments for integrating a function with respect to time, which integrated function is then indicated by the instrument.

An object of the invention is to provide a novel integrating mechanism for instruments which are adapted to integrate and indicate a function, which mechanism may be made to operate according to any desired characteristic curve.

A still further object is to provide novel means in an integrating mechanism of the class described whereby a dial having equally spaced scale divisions may be used even though the rate of change responsive device responds in unequal increments for equal increments of rate.

Another object is to provide a novel integrating mechanism of the class described which is simpler in construction and operation than those of the prior art by virtue of its having fewer parts.

The essence of the invention or of the combination which renders the foregoing objects possible of accomplishment resides in the provision of only two cooperating integrating discs, one of which is a driving disc and the other a driven disc, the former being operated by a continuously operating constant speed mechanism, said discs being adapted for engagement with each other by means of a device responsive to the rate of change of the function to be integrated so that the driving disc drives the driven disc while the function exists whereby the function is integrated with respect to time, said discs also being constructed and arranged in a novel manner whereby the driving ratio therebetween may be made proportional to any desired characteristic curve; for example, to a straight line so that equal increments of indicating movements will be produced for unequal increments of actuating movements of the rate of change responsive device.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views:

Fig. 1 is a longitudinal section through the casing of one form of instrument embodying the present invention and illustrating the various elements constituting the instrument, as viewed from the top thereof;

Fig. 2 is a cross-sectional view taken on line 2—2 of Fig. 1;

Fig. 5 is an enlarged detail cross-sectional view, taken on line 5—5 of Fig. 1, of a portion of the operating mechanism of the instrument embodying the present invention;

Fig. 6 is a front elevation of another form of driving disc constituting a part of the invention; and Fig. 7 is a similar front elevation of still another form of driving disc.

Figure 3:
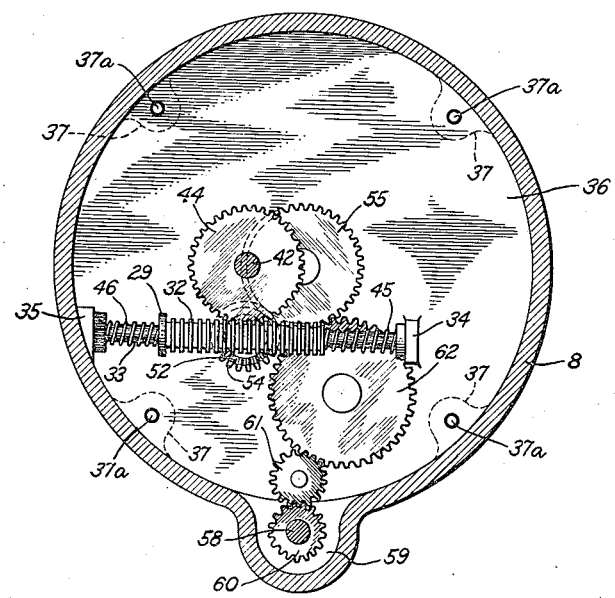
Fig. 3 is another cross-sectional view taken on line 3—3 of Fig. 1.

The invention is particularly adapted, but not limited, for use with an aircraft turn integrating indicator of the type disclosed in co-pending application of W. L. Smith, now Patent 1,998,207, Apr. 16, 1935, under which the assignee of the present application holds exclusive license.

For an understanding of the invention, the same has been illustrated in the drawings as applied to an instrument such as shown in the aforesaid patent and comprising an instrument for indicating the angular deviation of, or the angular distance traversed by, a mobile object during a turn or departure from a set path or course at any rate of such turn or departure, although the invention may be employed in any instrument in which a function is to be integrated with respect to time. The instrument, in general, comprises means for obtaining or deriving in any suitable manner a rate of change of a function such, for example, as the rate of turn or deviation of a mobile object, means for combining the element of time with the rate of change of the function, i. e., integrating mechanically the rate of change with respect to time, and means for indicating the results of such integration.

In order to carry the invention into effect, there is provided a rate of turn responsive device such, for example, as a gyroscopic turn indicator adapted to be mounted on a mobile object the deviation of which is to be indicated, and integrating with respect to time the rate at which the mobile object deviates from any set path or course whereby the amount of deviation or departure, or the angular distance traversed during such departure, may be ascertained and indicated. The integration of the rate with respect to time is accomplished mechanically by the provision of a continuously operating constant-speed mechanism for combining the element of time with the rate of turn or departure when a turn takes place, whereby the amount or the angle of such departure is obtained. Course-indicating means are also provided which are adjustable to operate with reference to any set path or course. The principal feature of the invention resides in the provision of novel means in and forming part of the integrating mechanism interposed between the constant-speed mechanism and the indicating means whereby the instrument may be made to operate in accordance with any desired and/or predetermined characteristic curve.

Referring now to the drawings and, more particularly, to Fig. 1, the instrument embodying the present invention is constituted by a casing or housing 8 made of some suitable light-weight material such as a phenolic-condensation product or aluminum, said casing having a rear wall 9 secured to or, as in the present invention, formed integral with said casing. The latter is also provided with projecting lugs or ears 10 (Fig. 4) whereby the instrument may be mounted on an instrument panel of a mobile object, such as a ship or aircraft, by means of suitable fastening elements such as screws (not shown) which are adapted to be inserted into holes 11 provided in the ears or lugs 10. The front of the casing is closed by means of a suitable transparent member, such as a cover-glass 12 which may be held in position in any suitable manner, as, for example, by means of a clamping ring 13, and through which a course-indicating means, such as a dial 14, may be viewed to indicate the results to be obtained by the instrument in a manner to be described hereinafter.

Means are provided which are responsive to a rate of change of a function such as the rate of turn or departure of the mobile object with which the instrument illustrated is adapted to be associated and, in the present embodiment, said means are constituted by a gyroscopic rate of turn indicator of a type now generally employed on aircraft. In the form shown, said indicator comprises a gyroscope having a rotor 15 journaled at 16 and 17 in a frame 18 so that the rotor may rotate about an axis parallel to or coincident with the transverse axis of the craft on which the instrument is mounted. The rotor may be driven in any suitable manner but, as illustrated, is arranged to be air-operated and for this purpose the rotor 15 is provided on its periphery with a plurality of turbine buckets 19 against which a jet of air is directed by means of a nozzle 20, the air being supplied thereto from a suitable source (not shown), or the air supply may be provided by exhausting the casing at any suitable point therein and leaving the exterior end of the nozzle 20 open to the atmosphere so that air will be sucked therethrough into the casing as the latter is exhausted, thereby directing the air which is sucked in from the exterior of the casing against the buckets 19.

The frame 18 which carries the gyro-rotor is journaled in another frame 21 by means of a pivot 22 carried centrally of the casing by the rear wall 9 and by means of a shaft 23 carried at the opposite end of the frame 18 so that upon turning of the mobile object and, hence, the casing 8 about a vertical axis which in Fig. 1 would be perpendicular to the plane of the paper, the frame will precess about another axis, i. e., the axis of pivot 22 and shaft 23, which is parallel to or coincident with the longitudinal axis of the mobile object. As is well-known to those skilled in the art, a gyroscope of the type described above and having two degrees of freedom is responsive to the rate of turn about an axis which is perpendicular to the axis of rotation of the rotor and to the axis of precession. Suitable centralizing means such, for example, as a coil spring 24 (Fig. 2) are provided for centralizing the gyro frame 18 after precession has ceased, i. e., for returning the frame to normal position. In this manner, the rate of turn of a craft on which the casing 8 is mounted is obtained.

In order to obtain the amount of the turn, an integrating mechanism is provided for combining the element of time with the rate of turn to obtain the angular distance traversed during such turn. In the form shown, said integrating mechanism is constituted by a continuously operating constant-speed mechanism including a shaft 25 which extends through the rear wall 9 of the casing 8 and which is journaled therein and in the front plate of the frame 21. The shaft 25 may be connected to any suitable drive (not shown) having a constant speed and on one end of said shaft there is provided a driving pinion 26 which meshes with and drives a gear 27, the latter being carried by and secured to a shaft 28 also journaled in the front plate of the frame 21 adjacent the shaft 25.

Means are provided for combining with the rate of turn the element of time which is derived from the drive shaft 25 and, as illustrated, comprise a relatively small friction disc 29 which is adapted to be moved into driving relation with and to be driven by a relatively large friction disc 30 carried by and secured to the shaft 28 and rotated by means of the pinion 26 and gear 27 when a turn takes place so that said disc 29 is rotated at a speed which is a combined function of the rate of turn and of the time during which such turn is being made. As shown in Fig. 1, the plane of the relatively small friction disc 29 is perpendicular to the plane of the relatively large friction disc 30 and in normal position, i. e., when no turn is taking place, said small disc is at the center of the large disc at which point there is obviously no driving relation between said discs. In order to insure firm contact between the discs, a spring 31 is provided, one end of which is secured to the front plate of the frame 21 and the other end of which bears against the end of the shaft 28 which carries the disc 30.

Means are now provided for moving the disc 29 longitudinally of its axis of rotation to either side of the center of the driving disc 30 so as to be driven thereby. As illustrated, said means comprise a circular rack 32 at one end of which is carried the small disc 29 and which is rotatable with and movable longitudinally of a shaft 33 journaled in projecting members 34 and 35 respectively. The projecting members 34 and 35 are carried by a plate 36 secured within the casing 8 in any suitable manner as by means of screws (not shown) adapted to be inserted into a plurality of bosses 37 (Fig. 3) carried by or formed integral with the interior of the casing 8, said plate 36 being parallel to the dial 14. In order that the circular rack 32 may rotate with and slide longitudinally on the shaft 33, the former is keyed on the latter by means of keys 38 and 39 arranged longitudinally on the shaft in diametrically opposed relation as shown in Fig. 5. The longitudinal movements of the rack 32 are derived from the gyroscope and, therefore, are proportional to the rate of turn. To this end, a gear train is provided for actuating said rack in accordance with precessional movements of frame 18. In the embodiment illustrated, said gear train is constituted by a pinion 40 carried by the pivot shaft 23 and is arranged to mesh with a gear 41 secured to or formed integral with a counter-shaft 42 journaled at one end in the front plate of the frame 21 and at the other end in a bracket 43. On the same shaft 42 with the gear 41 is a pinion 44 which meshes with and drives the circular rack 32 and thus imparts longitudinal movement thereto along the shaft 33 on which the rack is keyed. In addition to the spring 24 for centralizing the gyro frame 18, there are provided two coil springs 45 and 46 which are wound around shaft 33 at opposite ends of the circular rack 32 and which are arranged to be compressed against the projecting members 34 and 35, respectively, upon longitudinal movement of the rack 32 to the left or to the right, as viewed in Fig. 1, thereby centralizing the rack and, hence, the disc 29 so that the latter is always at the center of the driving disc 30 when no turn is taking place. From the foregoing it will be seen that if the gyro frame 18 precesses in a clockwise direction about the axis of pivot 22 and shaft 23, the circular rack 32 will be moved longitudinally to the right against the compression of the spring 46 thus moving disc 29 to the right of the center of the driving disc 30 but as soon as the gyro stops precessing spring 46 will be effective to return the disc 29 to its central position with respect to the disc 30. If, on the other hand, the gyro frame 18 precesses in a counter-clockwise direction, the rack 32 will be moved longitudinally to the left against the compression of spring 45 thus moving the disc 29 to the left of the center of disc 30, and when the precession stops the spring will be effective to move the rack and disc in the opposite direction into their normally central position. It will now be apparent that since the driving disc 30 is rotated at a constant speed by means of the shaft 25 through gears 26 and 27, said driving disc will drive the small disc 29 at a constant speed for a given position thereof with respect to the center of the driving disc. It will be further apparent that upon precession of the gyro frame 18 in one direction or another about the axis of pivot 22 and shaft 23 due to a turn of the craft about its vertical axis, the circular rack 32 and, hence, the disc 29 will be moved longitudinally in one direction or the other, thereby causing the disc 29 to drive the disc 30, said disc 29 being moved further away from the axis of rotation, that is, the center of the driving disc 30, as the rate of turn increases so that said disc 29 will take up a given position with respect to the driving disc 30 for a given rate of turn as determined by the gyro frame 18. This will be apparent from the fact that the further the disc 29 is moved from the center, the greater the relative travel of the former with respect to the latter for one revolution of the latter, thereby increasing the revolutions of the former.

Figure 4:
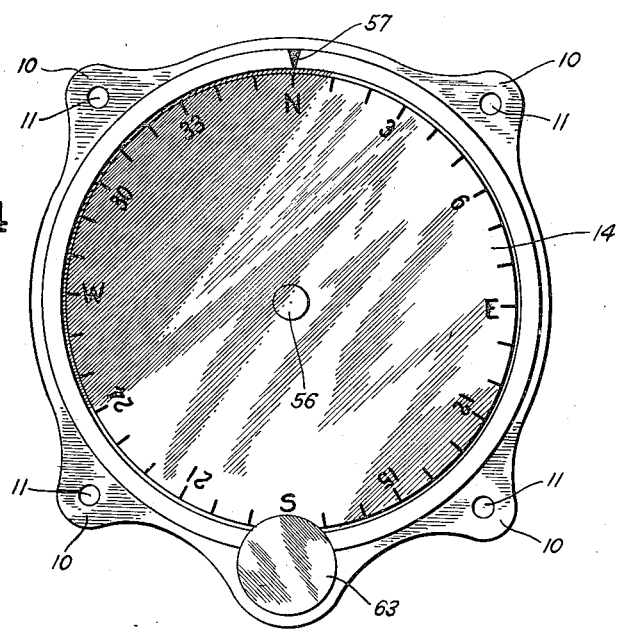
Fig. 4 is a front elevation of the instrument shown in Fig. 1.

Means are provided for transmitting the rotational movements of the driven disc 29 to a suitable indicating device which, in the present embodiment, is constituted by the course-indicating dial 14 and for this purpose a pinion 47 is provided on the shaft 33 which is arranged to mesh with a gear 48 carried by a counter-shaft 49, one end of which is journaled in the projecting member 35 and the other end of which is journaled in another projecting member 50 also carried by the plate 36. The counter-shaft 49 extends through the projecting member 50 and has secured thereto at its projecting end a beveled pinion 51 which is arranged to mesh with and drive a beveled gear 52 secured to or formed integral with a stub shaft 53 journaled in the plate 36. On the stub shaft 53 is another pinion 54 which meshes with a relatively large gear 55, the latter being secured to or formed integral with a shaft 56 journaled in the plate 36 and to which is secured the dial 14 and rotatable therewith. The course-indicating dial is calibrated in the present instance, as shown in Fig. 4, in terms of compass direction and cooperates with a lubber's mark 57 for indicating in degrees the amount and direction of the deviation as well as the new compass direction in which the mobile object is heading, if a turn is made, in the same manner as indicated by a magnetic compass. It will be apparent, however, that a rotatable pointer cooperating with an adjustable dial may be substituted for the dial 14 without departing from the scope of the invention.

It is desirable that the instrument be capable of adjustment to operate with reference to any selected path or course and for this purpose means are provided for manually rotating the course-indicating dial 14 independently of its actuation by the integrating mechanism. In the form shown, said means comprise a rotatable shaft 58 journaled in an auxiliary chamber 59 formed integral with the casing 8 and the shaft 58 has secured thereto a pinion 60 which is arranged to mesh with an idler gear 61, said idler gear being in constant mesh with a gear 62 which is in mesh with and drives the gear 55 thus causing the latter to rotate the dial 14. The shaft 58 must, of course, be arranged to be moved longitudinally in the manner described in the aforementioned patent, in order that the gear 60 may be moved into and out of engagement with the idler gear 61 as otherwise the setting mechanism would hinder the operation of the gear 55 by the integrating mechanism. An adjusting knob 63 (Fig. 1) is provided for operating the shaft 58 from the front of the casing to cause the longitudinal movement and rotation thereof to set the indicating dial for a pre-determined course in accordance with the compass direction which it is desired to follow and which may be determined from a magnetic compass carried by the mobile object on which the instrument is mounted.

It has been found that most rate of turn responsive devices such, for example, as the rate of turn indicator, do not respond in equal increments for equal increments of rate and, therefore, disc 29 would not be moved in equal increments across the face of the driving disc 30 by the circular rack 32. Consequently, the dial 14 would have to be calibrated in unequal scale divisions and a different dial would have to be provided for a different instrument, i. e., a dial of one instrument would not indicate correctly in another instrument of the same type. In accordance with the present invention, however, novel means are provided whereby in every instrument the rate of change responsive device is caused, for example, to produce equal angular increments of movement of the dial for equal increments of rate of change regardless of whether the rate responsive device itself moves in equal increments or not, i. e., even when the device moves in unequal increments for equal increments of rate, the dial will be rotated in equal increments for equal increments of rate and, therefore, may be graduated in equal scale divisions. Thus, a dial of one instrument may be used with that of another of the same type. In the present embodiment, said means comprise an arrangement whereby the driving ratio between the driven disc 29 and the driving disc 30 may be made proportional to a desired characteristic curve of the gyro as, for example, proportional to a straight line, thus providing a permanent calibration of the instrument. For this purpose, the face of the driving disc 30 is so formed as to provide a raised surface 64 (Figs. 2, 6, and 7) constituting a driving area which may be varied so as to extend over a part of the disc and the sides of which may be irregularly curved as shown at 65 in Fig. 2, or straight as shown at 66 in Fig. 6, or regularly curved as shown at 67 in Fig. 7. Preferably, the raised surface 64 is made to conform substantially to two sectors disposed diametrically opposite each other and joined at the center of the disc and the sides of which may be formed as stated above. The purpose of making the surface 64 conform substantially to the two diametrically opposed sectors is to cause the friction disc 29 to be driven by the cooperating friction disc 30 only during one-half of each revolution of the latter so as to permit the circular rack 32 to take up the correct position corresponding to a given rate of turn, which otherwise would not be possible because of the relatively high friction existing between the discs if they are in continuous contact. In other words, if the discs were in continuous contact, it would require a large amount of power to cause the circular rack 32 to move the disc 29 across the face of the disc 30. Moreover, if the driving area 64 extended over the entire surface of the disc 30, thus causing said discs to remain in continuous contact, it would not be possible to make the driving ratio between said discs proportional to the characteristics of the rate of change responsive device as contemplated by the invention. In order to prevent the large disc 30 from being urged into contact with the small disc 29 by the spring 31, except when the sectors forming the raised surface 64 bear against the periphery of the small disc, the shaft 28 is provided with a stop at its spring-engaged end, said stop, in the present instance, being in the form of a disc or flange 28a which cooperates with a boss 28b formed on the front plate of frame 21 whereby the longitudinal movement of the shaft 28 by the spring 31 is limited. In other words, when the disc or flange 28a is right up against the boss 28b, the small disc 29 cannot come in contact with the large disc at the depressed surfaces formed between the sectors of the raised surface 64 but only with the latter as and when the large disc 30 rotates. Therefore, the distance between stop 28a and boss 28b, through which the shaft 28 can move longitudinally, should be less than the thickness of the raised surface 64 of the disc 30.

In order to determine the shape of the driving area, the rate of turn responsive gyro is turned, on a turn table for example, about a vertical axis at several different rates of turn such that for each rate the position of the driven disc 29 with respect to the driving disc 30 is advanced in equal predetermined increments along the axis of the circular rack. The rate of turn for each increment of advance of the disc 29 is determined by measuring the time required to make a turn through a known angle. Then it is ascertained how many revolutions are made by the driving disc 30, which is rotated at a known constant speed, during the time required to make a turn through 360°. The next step is to calculate the circumference along which the driven disc 29 is operated on and by the driving disc 30 at each known position of said driven disc. Then, knowing this circumference together with the circumference of the driven disc 29 and the number of revolutions made by the driving disc 30 during the time required to turn through 360° to advance the driven disc a known increment, the required active driving circumference $x$ on the driving disc at each position of the driven disc may be calculated by the following equation derived by the foregoing test:

$$x = A - \frac{\frac{dn}{A} - AB}{n}$$

where $n$ = number of revolutions made by driving disc 30 during time required to make a turn of 360° at a rate which causes the driven disc 29 to move longitudinally a known increment of distance along its axis.

$d$ = total circumference on the driving disc at point of contact with driven disc.

$A$ = circumference of driven disc.

$B$ = driving ratio between rack 32 and dial 14.

As stated above, the required active driving circumference $x$ is determined for each position of the driven disc 29 along the face of the driving disc 30, said positions corresponding to equal increments of longitudinal movement of the driven disc for unequal increments of change of rate. Conversely, equal increments of change of rate produce unequal increments of linear travel of the driven disc 29 but due to the specially formed driving area on the driving disc 30, the unequal increments of travel of the disc 29 will be converted into equal angular increments of rotation of the dial 14. Since the driving area is divided into two equal sector portions, the circumference $x$ is divided by 2, thus giving the active circumference or arc of a circumference required for each portion of the driving area. These circumferences or arcs are then inscribed on the face of the driving disc 30 and the ends thereof joined by a curve extending from the periphery of the disc toward the center, thus giving the required curvature of the sides of the two sector portions which are necessary to produce equal angular increments of movement of the dial 14 for unequal increments of precession of the gyro produced by equal increments of change of rate, and, hence, for unequal increments of movement of the disc 29 across the face of the disc 30.

In the event that the rate responsive device moves through equal increments for equal increments of rate of change, then the effective driving area would have the form shown in Fig. 6, i. e., the sides of the two sectors would be constituted by radial lines, because in such a case the inherent characteristic curve of the device would be a straight line and, hence, would be the desired characteristic curve. If, however, it is desired, for some reason, to operate the indicating means according to any other characteristic than the inherent characteristic of the rate of change responsive device, then the shape of the driving area is so formed as to produce the result of the desired characteristic. In other words, the characteristic curve of the indicating means may be made to conform to any desired curve whether a regular or irregular curve or a straight line, depending on the results desired to be obtained by the indicating means.

The operation of the device is as follows:

Assume that a predetermined or selected path or course on which it is desired to head the ship or aircraft is due north, the ship or aircraft is swung until the magnetic compass indicates due north, at which time the knob 63 of the novel turn integrator is moved inward so that the pinion 60 engages the gear 61 and the knob is rotated until the dial 14 indicates north with respect to the lubber's mark 57. The knob is then released and the pinion 60 and gear 61 will be disengaged by an outward movement of the shaft 58. The ship or aircraft is then steered on the due north heading, but, if for any reason or due to any external influences, the mobile object deviates to the left, for example, or is deliberately turned to the left, the gyro rotor 15 will cause the frame 18 to precess in a direction corresponding to the direction of turn or deviation, thereby causing the circular rack 32 to be moved in the proper direction so that the friction disc 29 is moved in a corresponding direction from the center of the driving disc 30, said disc 29 then being driven to rotate the course indicating dial 14 clockwise, the rotation of said disc 29 and, hence, of the dial 14 being a combined function of rate of turn and of the time during which such turn is made, because when the rate of turn is relatively slow, the friction disc 29 will be nearer the center of the driving disc 30, and when the rate of turn increases, the disc 29 is moved further away from the center of the disc 30 thereby causing the disc 29 to be rotated faster by the constant-speed shaft 25 through the disc 30. As soon as the turn or deviation has ceased, the precession of the indicator will also cease and the frame 18 will be returned to its normally centralized position by means of the centralizing spring 24 and, hence, the circular rack 32 will also be returned to its normally central position and the friction disc 29 will be at the center of the driving friction disc 30, the centralizing of the rack 32 being aided by the springs 45 and 46. The course indicating dial 14 will then indicate, in terms of compass direction, the number of degrees which the ship or aircraft has turned or deviated and the ship or aircraft can then be steered so that it will turn in the opposite direction until the course indicating dial again indicates the due north heading, in which case, during such a return deviation, the precessional frame 18 will precess in a direction opposite to that in which it precessed in the first instance, thereby causing the disc 29 to be moved to the other side of the center of disc 30 and rotated in an opposite direction and, hence, the course indicating dial 14 will be rotated in a counter-clockwise direction until the north mark coincides with the lubber's mark 57. By virtue of the novel form of the driving disc 30, the dial 14 will be rotated in equal increments with respect to the lubber's mark 57 for equal increments of rate of turn, even though the turn indicator precesses in unequal increments for such equal increments of rate thus making it possible to graduate the dial 14 in equal scale divisions as shown in Fig. 4 of the drawings.

There is thus provided a novel integrating mechanism for instruments which are adapted to integrate a function and to indicate such function, whereby the instrument is made to operate according to any desired characteristic curve regardless of what the shape of the inherent characteristic curve of the rate of change device may be, although, in the illustrated embodiment, the integrating mechanism has been made to operate the indicating means in such a manner that the dial of the instrument may be graduated in equally-spaced divisions. Also, by reason of the novel integrating mechanism, any instrument may be easily and permanently calibrated so as to give an indication which is a function of a desired characteristic curve.

There is also provided a novel integrating mechanism which is relatively simple in construction and operation by virtue of its having relatively few parts.

Although only one embodiment of the invention has been illustrated as applied to a specific type of instrument, it will now be apparent to those skilled in the art that various changes and modifications in the form and relative arrangement of the parts may be made without departing from the scope of the invention, and that the invention may be applied to types of integrating instruments other than that specifically illustrated. Reference is, therefore, to be had to the appended claims for a definition of the limits of the invention.

What is claimed is:

1. In apparatus of the class described, the combination of course-indicating means adapted to be carried by a mobile object, means responsive to the rate of turn of the mobile object, a pair of integrating discs arranged in planes at right angles to each other whereby one is adapted to drive the other, the driven disc having its periphery normally at the center of the driving disc, a continuously operating constant-speed mechanism for operating the driving disc, means operated by said rate-of-turn-responsive means for moving the driven disc radially across the driving disc to either side of the center of the latter for combining the rate of turn with the element of time, and means connecting said driven disc to said course-indicating means for operating the latter to indicate the integrated amount of turn of the mobile object.

2. In apparatus of the class described, the combination of means responsive to the rate of change of a condition or operation, a pair of integrating discs, the plane of one of which is perpendicular to the plane of the other whereby one is adapted to drive the other, the driven disc having its periphery normally at the center of the driving disc and the latter having a driving area constituting raised portions on its face so formed that the driven disc is driven according to a desired operating characteristic whereby the inherent operating characteristic of the rate of change responsive means is made to substantially conform to said desired operating characteristic, a continuously operating constant-speed mechanism for operating the driving disc, means operated by said rate of change responsive device for moving the driven disc radially across the driving disc to either side of the center of the latter for combining the rate of change with the element of time, and indicating means operated by said driven disc for indicating the integrated quantity.

3. In apparatus of the class described, the combination of means responsive to the rate of change of a condition or operation, means for integrating the rate of change with respect to time, said means including a constant-speed mechanism, a pair of integrating discs the plane of one of which is perpendicular to the plane of the other whereby one is adapted to drive the other, the driving disc being operatively connected to the constant-speed mechanism, one of said discs being adapted to be moved radially across the face of the other, means actuated by the rate of change responsive means for moving the movable disc across the face of the other disc nearer to or further from the center thereof whereby the driving disc operates the driven disc at one constant speed for a given rate of change and at another constant speed for a different rate of change, as determined by the position of the movable disc with respect to the center of the other disc, said other disc having a contact area constituting raised segments so shaped and formed on the face thereof that the driving ratio between the two discs is proportional to a desired operating characteristic whereby the inherent operating characteristic of the rate of change responsive device is made to substantially conform to said desired operating characteristic, and indicating means operated by the driven disc for indicating the integrated quantity.

4. Integrating mechanism comprising a driving disc, a driven disc arranged in a plane perpendicular to said driving disc and adapted to be driven thereby, means for moving said driven disc radially across the face of said driving disc, and means for rotating said driving disc at constant speed, said driving disc having a contact area constituted by raised sectors so formed that the driving ratio between said discs conforms to a desired characteristic.

HERMAN IMHOF.